Patented Dec. 26, 1939

2,184,637

UNITED STATES PATENT OFFICE 2,184,637

FERMENTATION PROCESS FOR TREATING CRUDE ETHEREAL OILS

Willy Ekhard, Berlin-Pankow, Germany

No Drawing. Application June 15, 1936, Serial No. 85,304. In Germany June 18, 1935

9 Claims. (Cl. 195—3)

This invention relates to a process for improving terpenes, camphor, peppermint oil and similar hydrogenated cyclic organic compounds.

Processes are known for refining and improving terpenes, camphor, peppermint oil and the like ethereal oils and oil mixtures. These known processes are based either on fractionating procedures or on chemical treatments, for example oxidizing and reducing processes.

Improvements or alterations with regard to odor or taste are chiefly produced by these known processes.

The object of the present invention is a process for improving the aforesaid compounds which is entirely different from these known processes and the essential characteristic of which is that the improvement is effected by the action on the aforesaid initial substances of micro-organisms, which are present in a nutrient medium of foreign nature. In contradistinction to the aforesaid known purely chemical or physical processes, this invention is accordingly concerned with a process based on biological principles.

Sugar-fermenting micro-organisms, such as saccharomycetes (yeasts) have proved to be particularly efficient as well as acid-forming micro-organisms, for example lactic acid producers, such as *Bacillus Delbrücki, Bacillus Leichmann, Bacillus Bulgaricus, Streptococcus Thermophilus* or other acid-formers, such as micro-organisms producing propionic acid, butyric acid and other organic acids. Several of these micro-organisms may be employed simultaneously or successively.

As nutrient media there may be employed sugar solutions or specific substrata, which stimulate the micro-organisms to full activity.

The process of this invention is carried into effect by mixing or emulsifying the product to be refined with a fermenting sugar solution during the process of fermentation and after fermentation has taken place separating the product from the fermented solution and then washing the same.

The advantage of the process of this invention is that a particularly permanent effect is obtained. The fermentation probably proceeds in such a way that individual components of the product under treatment are included in the metabolism cycle of the microorganisms. The resulting reactions may be substantially activated by maintaining definite degrees of acidity, if necessary with the addition of suitable buffer mixtures, and definite temperatures and may be influenced by adding certain nutrient salts or catalysts or activators. The activation may also be effected by suitable exposure for example to ultra violet rays. Hydrogen ion concentrations corresponding to pH values of from 4 to 7 have proved to be suitable; serviceable products are however still obtained in weakly alkaline solution. The temperatures employed vary between about 25 and 60° C. depending upon the micro-organisms employed. Chlorides, such as sodium chloride, may be used as activators and metals and their compounds, for example nickel carbonate, manganese salts and the like, may be used as catalysts. The usual nutrient salts, such as magnesium sulphate, calcium carbonate, potassium phosphate and the like are added in sufficient quantities. As a general rule the methods known in fermenting processes of every kind for regulating the reactions by adding substances, such as sodium sulphite and magnesium sulphate, may also be employed for the same purpose in the fermentation according to this invention of the ethereal oils, terpenes, camphor and the like hydrogenated cyclic organic compounds, as well as natural mixtures containing such compounds.

Continuous mild oxidation, which does not inhibit microorganism activity, has proved to be advantageous for activating the fermentation process of this invention. This oxidation may for example be effected by passing air therethrough, careful ozonizing, gradual introduction of peroxides, permanganate, hydrogen peroxide or the like. In such a case reductions owing to the biological influences and at the same time reinforced oxidation accordingly take place during fermentation.

Since in such microorganism fermentations we are dealing with the action of certain enzymes, the fermentation may also be carried out with the isolated structureless enzymes themselves, for example with compressed yeast or autolysates possessing enzymatic ativity, as well as combinations of the aforesaid bacterial enzymatic solutions.

The fermentative bacterial or enzymatic processes of this invention may also be combined with known chemical or physical processes.

Alterations and improvements in the odor and taste of the hydrogenated cyclic organic compounds may also be effected according to this invention by means of esterifications carried out biologically. These may be combined with the fermenting processes hereinbefore referred to or may be carried out separately therefrom. Esterifications of necessity take place in a mixed alcoholic-acid fermentation (e. g. of yeast and *Bacillus Bulgaricus*). Such esterifications may, for example, be produced, if necessary in the presence of ethyl alcohol, butyl alcohol or other higher alcohols, with butyric acid bacteria, lactic acid bacteria, acetic acid bacteria, particularly *Bacterium acetosum*, and various yeasts and combinations of these organisms. According to the invention these esterifications are promoted by the addition of catalysts, particularly metals, preferably tin or zinc.

Example 1

1 liter of crude peppermint oil is emulsified by stirring with 500 cc. of a 5% sugar solution, which has been inoculated with 25 gms. of compressed yeast, and fermented. During the fermentation a temperature of about 20° C. is to be maintained. After completion of the fermentation the fermented nutrient medium is separated from the oils by deposition and the oil is washed.

Example 2

The same procedure is followed as in Example 1, only air is passed through the emulsion during the process of fermentation. Oxidation takes place simultaneously during the reaction owing to the biological processes.

Example 3

1 liter of bergamot oil is emulsified with 500 cc. of Raulin's solution, which contains the known nutrient salts for the micro-organisms. The nutrient medium is inoculated with *Bacillus Delbrücki* (lactic acid-former) and incubated. The *Bacillus Delbrücki* is grown in known manner on suitable nutrient substrata (e. g. whey) and the nutrient medium is inoculated with about 5% of this culture, calculated on the nutrient medium. After fermentation, which is carried out at about 42° C., has taken place the nutrient medium is separated from the substance under treatment and the latter is washed clean, if necessary with the addition of neutralizing agents.

What I claim is:

1. A process for improving crude ethereal oils selected from the group consisting of terpenes, camphor and peppermint oil, as well as mixtures containing such crude ethereal oils, comprising the steps of emulsifying the substances to be improved with a fermenting culture medium for yeast and bacterial acid formers, subjecting said substances to a biological fermentation by microorganisms selected from the group consisting of yeast and bacterial acid formers, and separating the substances thus improved from the culture medium after said fermentation.

2. A process for improving crude ethereal oils selected from the group consisting of terpenes, camphor and peppermint oil, as well as mixtures containing such crude ethereal oils, comprising the steps of emulsifying the substances to be improved with a fermenting culture medium for yeast and bacterial acid formers, subjecting said substances to a biological fermentation by microorganisms selected from the group consisting of yeast and bacterial acid formers, passing a free oxygen containing gas through said mixture of substances and culture medium during the fermentation, and separating the substances thus improved from the culture medium after said fermentation.

3. A process for improving crude ethereal oils selected from the group consisting of terpenes, camphor and peppermint oil, as well as mixtures containing such crude ethereal oils, comprising the steps of emulsifying the substances to be improved with a fermenting culture medium for yeast and bacterial acid formers, adding oxidizing agents to said mixture of substances and culture medium, subjecting said substances to a biological fermentation by microorganisms selected from the group consisting of yeast and bacterial acid formers, and separating the substances thus improved from the culture medium after said fermentation.

4. A process for improving crude ethereal oils selected from the group consisting of terpenes, camphor and peppermint oil, as well as mixtures containing such crude ethereal oils, comprising the steps of emulsifying the substances to be improved with a fermenting culture medium for yeast and bacterial acid formers, maintaining said mixture of substances and culture medium corresponding to pH values of 4 to 7, adding buffer mixtures to said mixture, subjecting said substances to a biological fermentation by microorganisms selected from the group consisting of yeast and bacterial acid formers, and separating the substances thus improved from the culture medium after said fermentation.

5. A process as claimed in claim 1, whereby the fermentation is carried out in the presence of catalysts.

6. A process for improving crude ethereal oils selected from the group consisting of terpenes, camphor and peppermint oil, as well as mixtures containing such crude ethereal oils, comprising the steps of emulsifying the substances to be improved with a sugar solution being inoculated with yeast, subjecting said substances to a biological fermentation, and separating the substances thus improved from the culture medium after said fermentation.

7. A process for improving crude ethereal oils selected from the group consisting of terpenes, camphor and peppermint oil, as well as mixtures containing such crude ethereal oils, comprising the steps of emulsifying the substances to be improved with a sugar solution being inoculated with acid-forming micro-organisms, selected from the group consisting of *Bacillus Delbrücki*, *Bacillus Leichmann*, *Bacillus Bulgaricus*, *Streptococcus Thermophilus*, subjecting said substances to a biological fermentation, and separating the substances thus improved from the culture medium after said fermentation.

8. A process according to claim 1, whereby the substances to be improved are subjected to the action of biological ester formers.

9. A process according to claim 1, whereby the substances to be improved are subjected to the action of biological ester formers and the esterification is carried out in the presence of catalytically acting metallic substances, selected from the group consisting of tin and zinc.

WILLY EKHARD.